United States Patent
Zhang et al.

(10) Patent No.: US 12,489,944 B2
(45) Date of Patent: Dec. 2, 2025

(54) SYSTEM AND METHOD FOR LINKING STREAMING AUDIO AND VIDEO DATA WITH LIGHTING DEVICES, AND STORAGE MEDIUM

(71) Applicant: Bweetech Electronics Technology (Shanghai) Co.,Ltd, Shanghai (CN)

(72) Inventors: Junjun Zhang, Shanghai (CN); Weibo Qian, Shanghai (CN); Jihong Liu, Shanghai (CN)

(73) Assignee: Bweetech Electronics Technology (Shanghai) Co., Ltd, Shanghai (CN)

( * ) Notice: Subject to any disclaimer, the term of this patent is extended or adjusted under 35 U.S.C. 154(b) by 0 days.

(21) Appl. No.: 18/279,871

(22) PCT Filed: Dec. 28, 2022

(86) PCT No.: PCT/CN2022/142994
§ 371 (c)(1),
(2) Date: Aug. 31, 2023

(87) PCT Pub. No.: WO2024/016603
PCT Pub. Date: Jan. 25, 2024

(65) Prior Publication Data
US 2025/0142162 A1    May 1, 2025

(30) Foreign Application Priority Data
Jul. 20, 2022    (CN) .......................... 202210863273.3

(51) Int. Cl.
*H04N 21/4363*    (2011.01)
*G06V 10/56*    (2022.01)
(Continued)

(52) U.S. Cl.
CPC ....... *H04N 21/43635* (2013.01); *G06V 10/56* (2022.01); *G06V 10/60* (2022.01);
(Continued)

(58) Field of Classification Search
CPC ........... H04N 21/43635; H04N 1/6008; H04N 21/4394; H04N 21/44008; H04N 21/436;
(Continued)

(56) References Cited

U.S. PATENT DOCUMENTS

2006/0245174 A1* 11/2006 Ashdown ............... H05B 45/37
362/85
2019/0238809 A1* 8/2019 Davies ................. G09G 3/3413
(Continued)

FOREIGN PATENT DOCUMENTS

CN    113573442 A    10/2021
CN    114126135 A  *  3/2022    ........... H04N 21/426
(Continued)

OTHER PUBLICATIONS

Espacenet's description translated to English—CN114126135.pdf, Liu Chengxu, Light video picture intelligent interaction system, light video picture intelligent interaction control method and television, Date: Mar. 1, 2022, Shenzhen Maijie Photoelectric Internet of Things Co Ltd, pp. 1-11.*

*Primary Examiner* — Adil Ocak
(74) *Attorney, Agent, or Firm* — IPRTOP LLC

(57) ABSTRACT

A system for linking streaming audio and video data with lighting devices, comprising: an HDMI parsing device, configured to parse streaming media content to obtain a parsing result, where the parsing result comprises video data and audio data, when the lighting devices are instructed to be in linkage with the video data, the HDMI parsing device converts color data of each frame of the video data into first rendering data corresponding to different regions, when the lighting devices are instructed to be in linkage with the audio data, the HDMI parsing device extracts attribute information from the audio data, searches for second rendering data, and packages the second rendering data into second data packets for broadcasting; lighting devices, configured to receive the
(Continued)

first or second data packets and access corresponding entries of rendering data, and respectively generate lighting effects based on the corresponding entries of rendering data.

8 Claims, 4 Drawing Sheets

(51) Int. Cl.
    *G06V 10/60*     (2022.01)
    *H04N 1/60*     (2006.01)
    *H04N 21/439*     (2011.01)
    *H04N 21/44*     (2011.01)
    *H05B 47/19*     (2020.01)

(52) U.S. Cl.
    CPC ....... *H04N 1/6008* (2013.01); *H04N 21/4394* (2013.01); *H04N 21/44008* (2013.01); *H05B 47/19* (2020.01)

(58) Field of Classification Search
    CPC ........ G06V 10/56; G06V 10/60; H05B 47/19; H05B 47/1985; H05B 47/165; Y02B 20/40; H04L 67/12
    USPC .......................................................... 725/80
    See application file for complete search history.

(56) References Cited

U.S. PATENT DOCUMENTS

2021/0092340 A1*   3/2021   Kang ..................... H04N 9/646
2024/0431005 A1*  12/2024   Aliakseyeu ............ H05B 45/20

FOREIGN PATENT DOCUMENTS

| CN | 114158160 A | 3/2022 |
| CN | 114666936 A | 6/2022 |
| CN | 115334099 A | 11/2022 |
| WO | WO 2022013131 A1 | 1/2022 |

* cited by examiner

SYSTEM AND METHOD FOR LINKING STREAMING AUDIO AND VIDEO DATA WITH LIGHTING DEVICES, AND STORAGE MEDIUM

FIELD OF TECHNOLOGY

The present disclosure relates to the technical field of illumination, in particular to a system and a method for linking streaming audio and video data with lighting devices, and a storage medium.

BACKGROUND

As people's living standards improve, their expectations for lighting go beyond just basic illumination. Nowadays, lighting is also expected to create an appropriate atmosphere that changes according to the scene. There are products on the market that can change the color of lights based on the color and sound of a video. There are two main solutions for this type of products:

The first solution controls the lights through wired communication. However, this method is difficult to implement and doesn't allow for easy changes to the lights that are linked to the video.

The second solution is Philips' hue system, which uses Zigbee wireless control to link the lights. However, since the commands for controlling the color and brightness of the lights are not standard Zigbee application layer protocols, only Philips' lights can be connected. Other manufacturers' Zigbee lights cannot be connected. Additionally, Philips' hue system requires a special video linkage bridge, which increases the cost of use.

Therefore, there is an urgent need to provide a system and a method for linking streaming audio and video data with lighting devices, and a storage medium to solve the above-mentioned defects of related technologies.

SUMMARY

In view of the above-mentioned defects, the present disclosure provides a system and a method for linking streaming audio and video data with lighting devices, and a storage medium.

A first aspect of the present disclosure provides a system for linking streaming audio and video data with lighting devices, comprising: an HDMI parsing device, configured to be communicatively connected to a smart terminal and to receive a control instruction sent by the smart terminal, wherein the HDMI parsing device selects streaming media content based on the control instruction and parses the streaming media content to obtain a parsing result, where the parsing result comprises video data and audio data; when the lighting devices are instructed to be in linkage with the video data, the HDMI parsing device converts color data of each frame of the video data into first rendering data corresponding to different regions obtained through planar division of a lighting space encompassing the lighting devices, and packages the first rendering data into first data packets for broadcasting, wherein the first rendering data are to be used for rendering an immersive lighting effect; when the lighting devices are instructed to be in linkage with the audio data, the HDMI parsing device extracts attribute information from the audio data, searches for second rendering data corresponding to the attribute information, and packages the second rendering data into second data packets for broadcasting, wherein the first rendering data or the second rendering data comprises rendering data corresponding to each of the regions of the lighting space; lighting devices, configured to be communicatively connected to the HDMI parsing device and to receive the first or second data packets, wherein the lighting devices access corresponding entries of rendering data in the data packets they received based on display position information stored in their respective memory, and respectively generate lighting effects based on the corresponding entries of rendering data.

In an embodiment of the present disclosure, each entry of the first or second rendering data comprises a CIE 1931 color coordinate and a brightness value, and the attribute information of the audio data comprises sound frequency and sound intensity.

In an embodiment of the present disclosure, the HDMI parsing device comprises: an HDMI matrix chip, configured to select the streaming media content based on the control instruction and separate the video data from the audio data; a down-conversion chip, configured to convert the video data into RGB arrays of pictures with a preset frame rate; a processor, configured to count numbers of pixels of the video data corresponding to different region s of the lighting space, to add up RGB values of the pixels of each region to obtain an accumulated RGB value and an average RGB value of the region, wherein the processor is further configured to calculate a brightness value of each region based on the average RGB value of the region, and converts the average RGB value of each region into a corresponding CIE 1931 color coordinate; wherein the processor is further configured to package the CIE 1931 color coordinate and brightness value corresponding to each region into one of the data packet s in an order based on the planar division; and a communication module, configured to broadcast the data packets.

In an embodiment of the present disclosure, the processor is further configured to search for an RGB value and a brightness value of each region corresponding to the sound intensity of the audio data, and convert the RGB value of each region corresponding to the sound intensity into the corresponding CIE 1931 color coordinate, wherein the processor is further configured to package the CIE 1931 color coordinate and the brightness value corresponding to each region into one of the data packets, and the brightness value changes along with the sound intensity.

In an embodiment of the present disclosure, the display position information stored in the respective memory of the lighting devices comprises a stereo spatial correspondence between the lighting devices and the regions.

In an embodiment of the present disclosure, the lighting devices access corresponding CIE 1931 color coordinates and brightness values in the data packets they received based on the stereo spatial correspondence after receiving the data packets broadcasted by the communication module, driving RGB beads of the lighting devices to output light with a corresponding color and brightness.

In an embodiment of the present disclosure, the communication module comprises a ZigBee&BLE dual-module or a WiFi&BLE dual-module.

In an embodiment of the present disclosure, the HDMI parsing device supports HDMI 2.1, HDMI 2.0 and HDMI 1.4, and the streaming media content comprises one or more of a streaming media content with a 4K resolution and a 120 Hz refresh rate and a streaming media content with an 8K resolution and a 60 Hz refresh rate.

A second aspect of the present disclosure provides a method for linking streaming audio and video data with lighting devices, comprising: receiving a control instruction sent by a smart terminal, selecting streaming media content based on the control instruction, and parsing the streaming media content to obtain a parsing result, wherein the parsing result comprises video data and audio data; when the lighting devices are instructed to be in linkage with the video data, converting color data of each frame of the video data into first rendering data corresponding to different regions obtained through planar division of a lighting space encompassing the lighting devices, and packaging the first rendering data into first data packets for broadcasting, wherein the first rendering data are to be used for rendering an immersive lighting effect; when the lighting devices are instructed to be in linkage with the audio data, extracting attribute information from the audio data, searching for second rendering data corresponding to the attribute information, and packaging the second rendering data into second data packets for broadcasting, wherein the first rendering data or the second rendering data comprises rendering data corresponding to each of the regions of the lighting space; when the lighting devices receive the first or second data packets, accessing corresponding entries of rendering data in the data packets they received based on display position information stored in their respective memory, and respectively generating lighting effects based on the corresponding entries of rendering data.

A third aspect of the present disclosure provides a computer-readable storage medium, stored with a computer program, wherein the method for linking the streaming audio and video data with the lighting devices is implemented by executing the computer program through a processor.

In summary, the system and method for linking streaming audio and video data with lighting devices, and the computer-readable storage medium of the present disclosure have the following beneficial effects:

First, the present disclosure utilizes BLE devices' capability to connect to smart terminals directly, and by configuring the main device and the lights that are linked to the video through a smart terminal, the configuration process is simplified and becomes more visual.

Second, the present disclosure adopts wireless communication dual-mode technologies to control the color and brightness of the lights wirelessly. This avoids the need for cumbersome wiring and reduces the installation workload.

Third, the system of the present disclosure can be easily connected to third-party smart home systems or smart lighting systems. At the same time, BLE devices use a private protocol that ensures real-time system updates through OTA, keeping BLE devices in their latest functional state.

Fourth, the present disclosure uses wireless control technologies and video full-screen real-time feature extraction technologies to easily achieve an immersive linkage experience in three-dimensional space.

Fifth, the system of the present disclosure realizes immersive lighting-interactive entertainment effects. The lighting devices can be a variety of colored wireless intelligent lamps, or may be colored light strips, lamp tubes, floor lamps, bedside lamps and other lighting devices that support pixel points or pixel segments.

Sixth, in the present disclosure, corresponding regions are obtained through planar division of a lighting space encompassing the lighting devices based on a stereo spatial correspondence between the lighting devices and the regions, information of which is directly written into the respective memory of the lighting devices. This allows for easy changes to the lights that are linked to the video, and the streaming audio and video data can be linked with the lighting devices in real time without relaying on a special video linkage bridge, so as to achieve a dynamic and immersive atmosphere with flowing colors and light.

Figure 1:
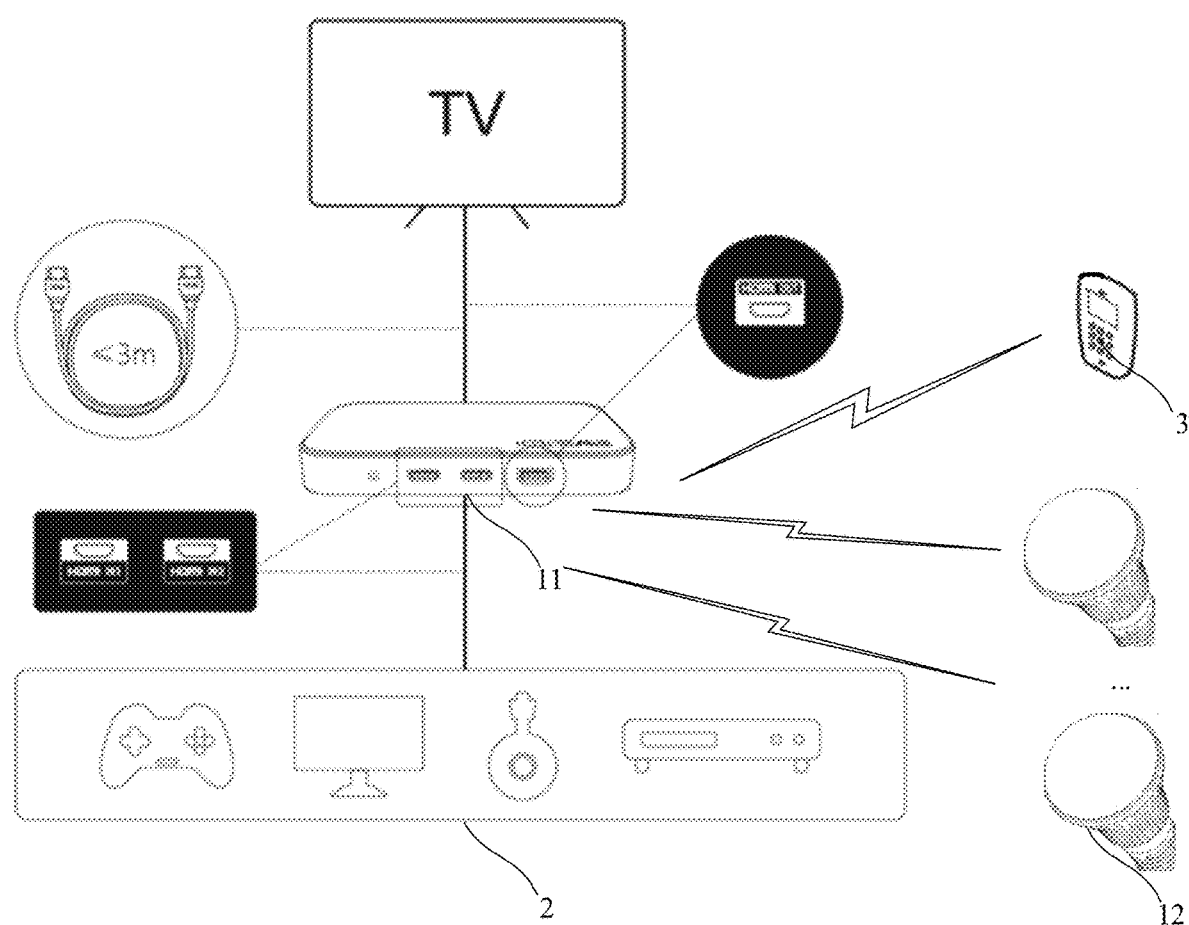
FIG. 1 shows an application scenario of a system for linking streaming audio and video data with lighting devices according to the present disclosure.

| | Reference Numerals |
|---|---|
| 1 | System for linking streaming audio and video data with lighting devices |
| 2 | Multimedia display device |
| 3 | Smart terminal |
| 11 | HDMI parsing device |
| 12 | Lighting devices |
| 111 | HDMI matrix chip |
| 112 | Down-conversion chip |
| 113 | Processor |
| 114 | Communication module |
| S41 to S43 | Various steps |

DETAILED DESCRIPTION

The embodiments of the present disclosure will be described below. Those skilled can easily understand disclosure advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated.

Embodiment 1

A system for linking streaming audio and video data with lighting devices is provided, comprising:

an HDMI parsing device, configured to be communicatively connected to a smart terminal and to receive a control instruction sent by the smart terminal, wherein the HDMI parsing device selects streaming media content based on the control instruction and parses the streaming media content to obtain a parsing result, where the parsing result comprises video data and audio data;

when the lighting devices are instructed to be in linkage with the video data, the HDMI parsing device converts color data of each frame of the video data into first rendering data corresponding to different regions obtained through planar division of a lighting space encompassing the lighting devices, and packages the first rendering data into first data packets for broadcasting, wherein the first rendering data are to be used for rendering an immersive lighting effect;

when the lighting devices are instructed to be in linkage with the audio data, the HDMI parsing device extracts attribute information from the audio data, searches for second rendering data corresponding to the attribute information, and packages the second rendering data into second data packets for broadcasting, wherein the first rendering data or the second rendering data comprises rendering data corresponding to each of the regions of the lighting space;

lighting devices, configured to be communicatively connected to the HDMI parsing device and to receive the first or second data packets, wherein the lighting devices access corresponding entries of rendering data in the data packets they received based on display position information stored in their respective memory, and respectively generate lighting effects based on the corresponding entries of rendering data.

Figure 2:
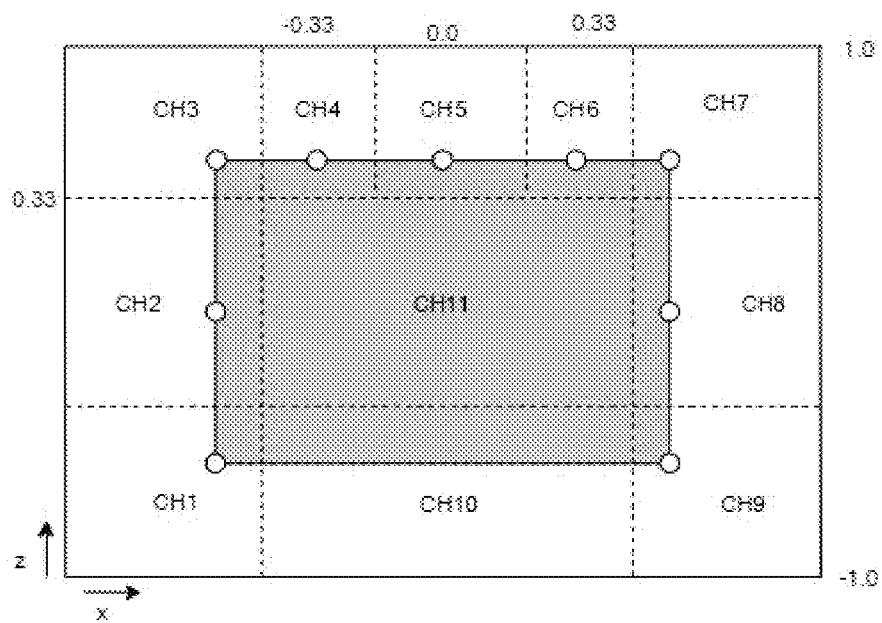
FIG. 2 shows a schematic diagram of different regions obtained through planar division of a lighting space encompassing lighting devices according to the present disclosure.

The system for linking the streaming audio and video data with the lighting devices (hereinafter, system 1) provided in Embodiment 1 will be described in detail below with reference to the drawings. Please refer to FIG. 1, which shows an application scenario of the system 1 according to the present disclosure. As shown in FIG. 1, the system 1 for linking the streaming audio and video data with the lighting devices is communicatively connected with a multimedia display device 2, such as TVs, Games, Projectors, etc., and a smart terminal 3. Specifically, the multimedia display device 2 is used for providing streaming media content to the system 1. The smart terminal 3 is configured to output a control instruction used for the system 1 through a human-computer interaction interface, so that the system 1 can link the streaming audio and video data with the lighting devices based on the control instruction after parsing the control instruction. The control instruction comprises: selecting one or more channels for providing the streaming media content, selecting the lighting devices linking with the streaming audio and video data, and selecting one or more regions obtained through planar division of a lighting space encompassing the lighting devices. Identifiers of the lighting devices (for example, numbers) are in one-to-one correspondence with the regions of the lighting space. In Embodiment 1, as shown in FIG. 2, the lighting space are divided into eleven regions, that is, CH 1, CH 2, . . . CH 11.

Figure 3A:
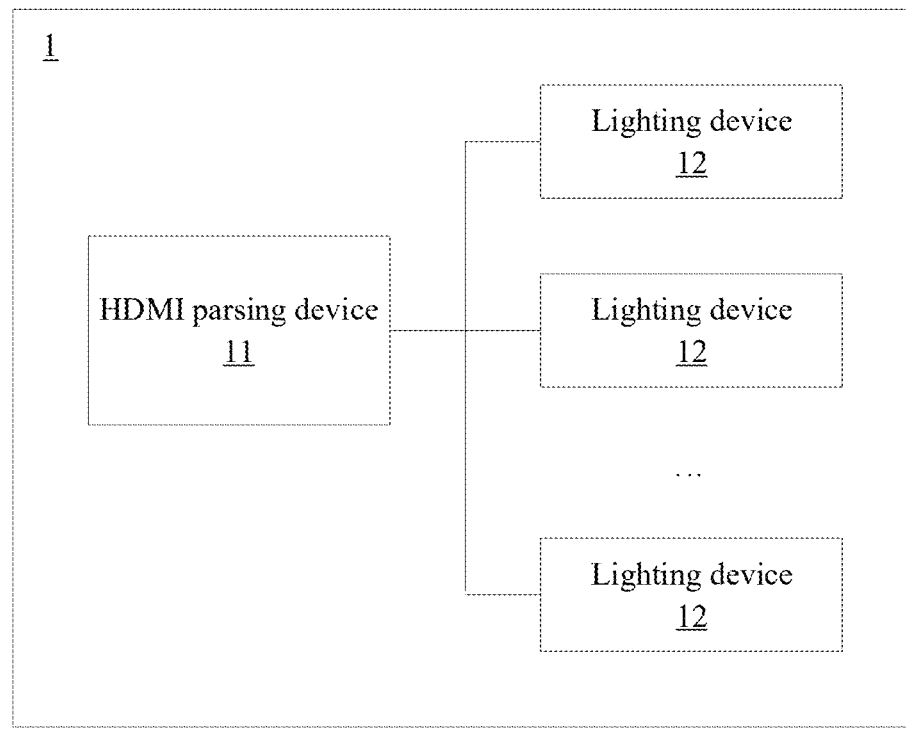
FIG. 3A shows a block diagram of a system for linking streaming audio and video data with lighting devices according to an embodiment of the present disclosure.
Figure 3B:
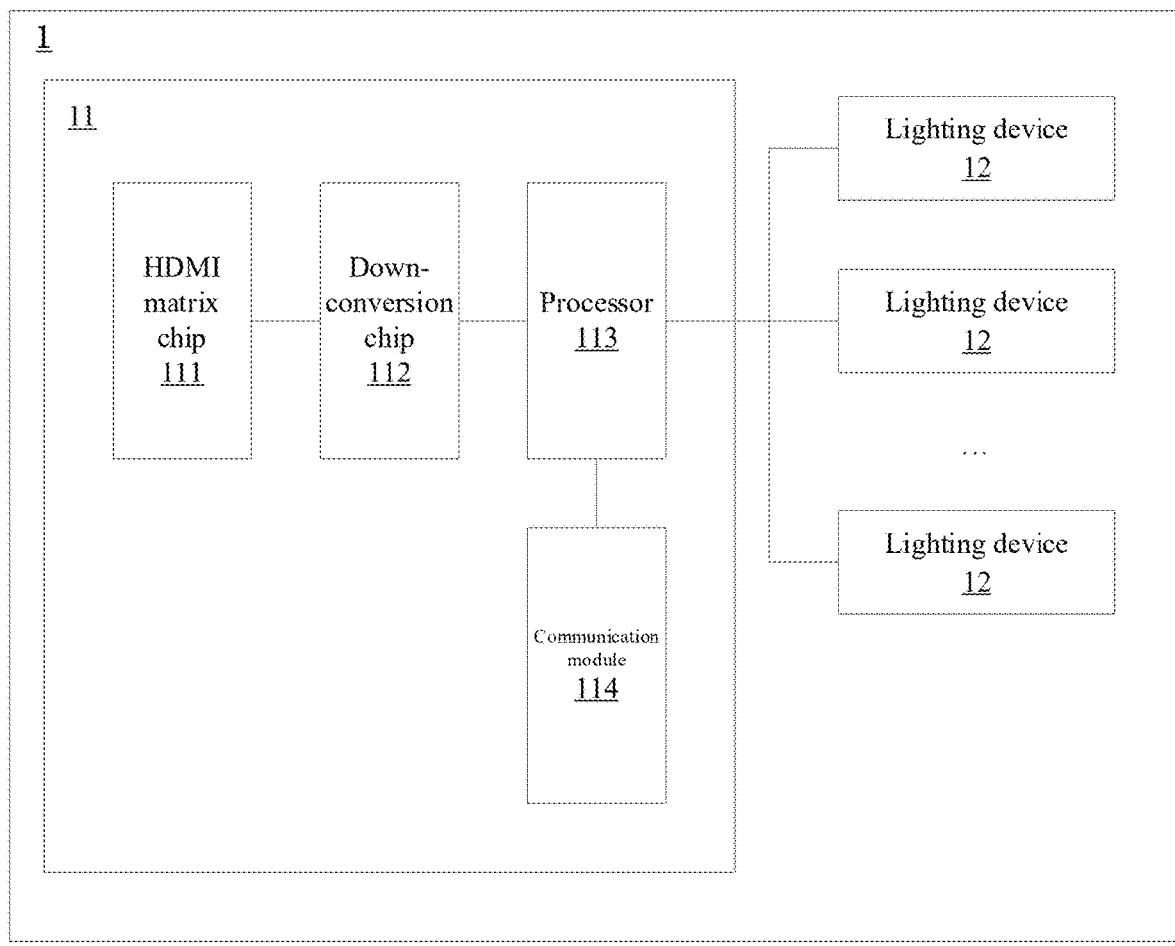
FIG. 3B shows a more detailed block diagram of the system for linking streaming audio and video data with lighting devices according to an embodiment of the present disclosure.

Referring to FIGS. 3A and 3B, FIG. 3A shows a block diagram of the system 1 according to an embodiment of the present disclosure, and FIG. 3B shows a more detailed block diagram of the system 1 according to an embodiment of the present disclosure.

As shown in FIG. 3A, the system 1 comprises an HDMI parsing device 11 and lighting devices 12 communicatively connected to the HDMI parsing device 11.

The HDMI parsing device 11 is configured to receive the control instruction sent by the smart terminal 3, wherein the HDMI parsing device 11 selects the streaming media content based on the control instruction and parses the streaming media content to obtain a parsing result, where the parsing result comprises video data and audio data.

When the lighting devices are instructed to be in linkage with the video data, the HDMI parsing device 11 converts color data of each frame of the video data into first rendering data corresponding to different regions obtained through planar division of a lighting space encompassing the lighting devices, and packages the first rendering data into first data packets for broadcasting. The first rendering data are to be used for rendering the immersive lighting effect. As an example, each entry of the first rendering data comprises a CIE 1931 color coordinate and a brightness value.

As an example, the HDMI parsing device 11 supports HDMI 2.1, HDMI 2.0 and HDMI 1.4, and the streaming media content comprises one or more of a streaming media content with a 4K resolution and a 120 Hz refresh rate, and a streaming media content with an 8K resolution and a 60 Hz refresh rate.

Refer to FIG. 3B. The HDMI parsing device 11 comprises an HDMI matrix chip 111, a down-conversion chip 112, a processor 113, and a communication module 114. As an example, the processor 113 is an FPGA or CPU with an ARM-Cortex series A kernel, which has a strong computing power.

Specifically, the HDMI matrix chip 111 is configured to select the streaming media content based on the control instruction (for example, select the streaming media content provided by HDMI 1 or HDMI 2), separate the video data from the audio data, and send the video data and the audio data to the down-conversion chip 112.

The down-conversion chip 112 is configured to convert the video data into RGB arrays of pictures with a preset frame rate, for example, thirty frames per second.

The processor 113 is configured to count numbers of pixels of the video data corresponding to different regions of the lighting space, to add up RGB values of the pixels of each region to obtain an accumulated RGB value and an average RGB value of the region, wherein the processor is further configured to calculate a brightness value of each region based on the average RGB value of the region, and converts the average RGB value of each region into a corresponding CIE 1931 color coordinate (x, y), wherein the processor is further configured to package the CIE 1931 color coordinate (x, y) and brightness value corresponding to each region into one of the data packets in an order based on the planar division. As an example, the data packets are packaged based on a fixed data structure.

As an example, a conversion formula of the brightness value of each region is Y=0.2990 R+0.5870 G+0.1140 B.

The communication module 114 is configured to broadcast the data packets to the lighting devices 12. As an example, the communication module 114 comprises a ZigBee&BLE dual-module or a WiFi&BLE dual-module.

When the lighting devices are instructed to be in linkage with the audio data, the HDMI parsing device 11 extracts attribute information from the audio data, searches for second rendering data corresponding to the attribute information, and packages the second rendering data into second data packets for broadcasting, wherein the second rendering data comprises rendering data corresponding to each of the regions of the lighting space. As an example, the attribute information of the audio data comprises sound frequency and sound intensity.

When the lighting devices are instructed to be in linkage with the audio data, the processor is further configured to search prestored lookup tables for an RGB value and a brightness value of each region corresponding to the sound intensity of the audio data, and convert the RGB value of each region corresponding to the sound intensity into the corresponding CIE 1931 color coordinate, wherein the processor is further configured to package the CIE 1931 color coordinate and the brightness value corresponding to each region into one of the data packets to obtain packaged data packets, and the brightness value changes along with the sound intensity. The communication module 114 sends the packaged data packets to the lighting devices 12.

As an example, when the lighting devices are instructed to be in linkage with the audio data, the processor is further configured to pre-store the RGB value and the brightness value of each region (CH1, CH2, ... CH11) corresponding to the sound intensity of the audio data.

The lighting devices 12 are configured to receive the first or second data packets, wherein the lighting devices 12 access corresponding entries of rendering data in the data packets they received based on display position information stored in their respective memory, and respectively generate lighting effects based on the corresponding entries of rendering data.

As an example, the display position information stored in each memory is provided based on a position and height of the lighting devices in an actual application scene, and the display position information stored in each memory is in one-to-one correspondence with the regions of the lighting space.

Specifically, the lighting devices 12 access corresponding CIE 1931 color coordinates and brightness values in the data packets they received based on a stereo spatial correspondence after receiving the data packets broadcasted by the communication module, driving RGB beads of the lighting devices to output light with a corresponding color and brightness, thereby linking the streaming audio and video data with the lighting devices and achieving a dynamic and immersive atmosphere with flowing colors and light.

It should be understood that the division of devices of the above system is only a logical function division, and the devices can be fully or partially integrated into a physical entity or physically separated in the actual implementation. In one embodiment, these modules can all be implemented in the form of software called by processing components. In one embodiment, they can also be all implemented in the form of hardware. In one embodiment, some of the devices can also be realized in the form of software called by processing components, and some of the devices can be realized in the form of hardware. For example, an x device may be a separate processing component, or may be integrated in a chip of the above-mentioned devices. In addition, the x device may also be stored in the memory of the above devices in the form of program code. The function of the above x device is called and executed by a processing component of the above devices. The implementation of other devices is similar. All or part of these devices may be integrated or implemented independently. The processing components described herein may be an integrated circuit with signal processing capabilities. In the implementation process, each operation of the above method or each of the above devices may be completed by an integrated logic circuit of hardware in the processor or an instruction in a form of software. The above devices may be one or more integrated circuits configured to implement the above method, such as one or more Application Specific Integrated Circuits (ASICs), one or more Digital Signal Processors (DSPs), or one or more Field Programmable Gate Arrays (FPGAs). When one of the above devices is implemented in the form of calling program codes by a processing component, the processing component may be a general processor, such as a Central Processing Unit (CPU) or other processors that may call program codes. These devices may be integrated and implemented in the form of a system-on-a-chip (SOC).

The system for linking the streaming audio and video data with the lighting devices in the present embodiment has the following beneficial effects:

First, the present disclosure utilizes BLE devices' capability to connect to smart terminals directly, and by configuring the main device and the lights that are linked to the video through a smart terminal, the configuration process is simplified and becomes more visual.

Second, the present disclosure adopts wireless communication dual-mode technologies to control the color and brightness of the lights wirelessly. This avoids the need for cumbersome wiring and reduces the installation workload.

Third, the system of the present disclosure can be easily connected to third-party smart home systems or smart lighting systems. At the same time, BLE devices use a private protocol that ensures real-time system updates through OTA, keeping BLE devices in their latest functional state.

Fourth, the present disclosure uses wireless control technologies and video full-screen real-time feature extraction technologies to easily achieve an immersive linkage experience in three-dimensional space.

Fifth, the system of the present disclosure realizes immersive lighting-interactive entertainment effects. The lighting devices can be a variety of colored wireless intelligent lamps, or may be colored light strips, lamp tubes, floor lamps, bedside lamps and other lighting devices that support pixel points or pixel segments.

Sixth, in the present disclosure, corresponding regions are obtained through planar division of a lighting space encompassing the lighting devices based on a stereo spatial correspondence between the lighting devices and the regions, information of which is directly written into the respective memory of the lighting devices. This allows for easy changes to the lights that are linked to the video, and the streaming audio and video data can be linked with the lighting devices in real time without relaying on a special video linkage bridge, so as to achieve a dynamic and immersive atmosphere with flowing colors and light.

Embodiment 2

A method for linking streaming audio and video data with lighting devices is provided, comprising:
receiving a control instruction sent by a smart terminal, selecting streaming media content based on the control instruction, and parsing the streaming media content to obtain a parsing result, wherein the parsing result comprises video data and audio data;
when the lighting devices are instructed to be in linkage with the video data, converting color data of each frame of the video data into first rendering data corresponding to different regions obtained through planar division of a lighting space encompassing the lighting devices, and packaging the first rendering data into first data packets for broadcasting, wherein the first rendering data is to be used for rendering an immersive lighting effect;
when the lighting devices are instructed to be in linkage with the audio data, extracting attribute information from the audio data, searching for second rendering data corresponding to the attribute information, and packaging the second rendering data into second data packets for broadcasting, wherein the first rendering data or the second rendering data comprises rendering data corresponding to each of the regions of the lighting space;

when the lighting devices receive the first or second data packets, accessing corresponding entries of rendering data in the data packets they received based on display position information stored in their respective memory, and respectively generating lighting effects based on the corresponding entries of rendering data.

Figure 4:
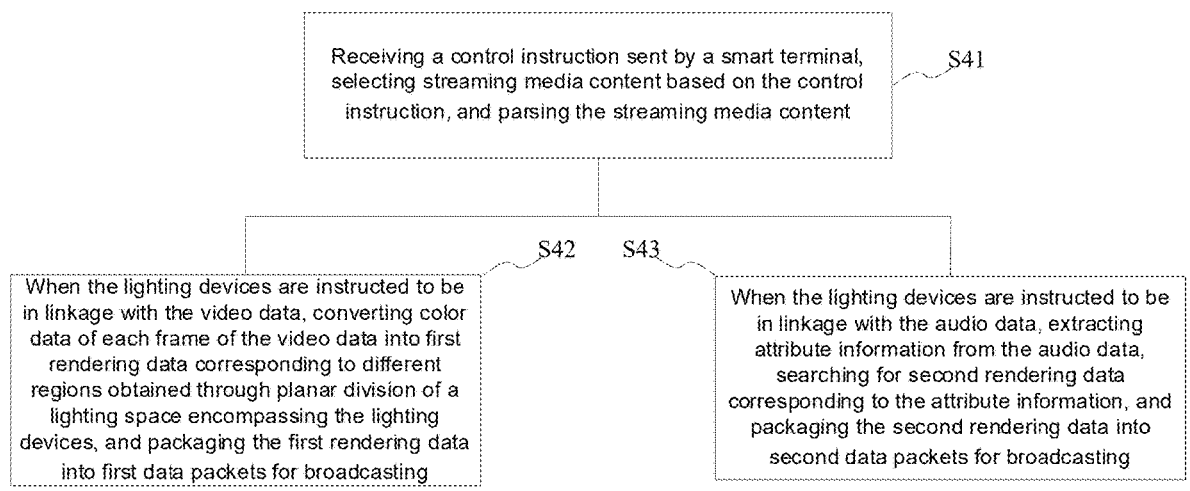
FIG. 4 shows a flowchart illustrating a method for linking streaming audio and video data with lighting devices according to an embodiment of the present disclosure.

The method for linking the streaming audio and video data with the lighting devices provided in Embodiment 2 will be described in detail below with reference to the drawings. FIG. 4 shows a flowchart illustrating a method for linking streaming audio and video data with lighting devices according to an embodiment of the present disclosure. As shown in FIG. 4, the method for linking the streaming audio and video data with the lighting devices comprises the following steps:

S41: receiving a control instruction sent by a smart terminal, selecting streaming media content based on the control instruction, and parsing the streaming media content to obtain a parsing result, wherein the parsing result comprises video data and audio data.

S42: when the lighting devices are instructed to be in linkage with the video data, converting color data of each frame of the video data into first rendering data corresponding to different regions obtained through planar division of a lighting space encompassing the lighting devices, and packaging the first rendering data into first data packets for broadcasting, wherein the first rendering data are to be used for rendering the immersive lighting effect.

Specifically, the step S42 comprises:

S421: selecting the streaming media content (for example, selecting the streaming media content provided by HDMI 1 or HDMI 2) based on the control instruction, separating the video data from the audio data, and sending the video data and the audio data.

S422: converting the video data into RGB arrays of pictures with a preset frame rate, for example, 30 frames per second.

S423: counting numbers of pixels of the video data corresponding to different regions of the lighting space, adding up RGB values of the pixels of each region to obtain an accumulated RGB value and an average RGB value of the region, calculating a brightness value of each region based on the average RGB value of the region, converting the average RGB value of each region into a corresponding CIE 1931 color coordinate (x, y), and packaging the CIE 1931 color coordinate (x, y) and brightness value corresponding to each region into one of the data packets in an order based on the planar division.

As an example, a conversion formula of the brightness value of each region is $Y=0.2990 R+0.5870 G+0.1140 B$.

S424: broadcasting the data packets to the lighting devices.

S43: when the lighting devices are instructed to be in linkage with the audio data, extracting attribute information from the audio data, searching for second rendering data corresponding to the attribute information, and packaging the second rendering data into second data packets for broadcasting, wherein the second rendering data comprises rendering data corresponding to each of the regions of the lighting space. As an example, the attribute information of the audio data comprises sound frequency and sound intensity.

Specifically, the step S43 comprises:

S431: when the lighting devices are instructed to be in linkage with the audio data, searching for an RGB value and a brightness value of each region corresponding to the sound intensity of the audio data.

S432: converting the RGB value of each region corresponding to the sound intensity into the corresponding CIE 1931 color coordinate.

S433: packaging the CIE 1931 color coordinate and the brightness value corresponding to each region into one of the data packets to obtain packaged data packets, wherein the brightness value changes along with the sound intensity.

S434: sending the packaged data packets to the lighting devices.

When receiving the first or second data packets, the lighting devices access corresponding entries of rendering data in the data packets they received based on display position information stored in their respective memory, and respectively generate lighting effects based on the corresponding entries of rendering data.

As an example, the display position information stored in each memory is provided based on the position and height of the lighting devices in the actual application scene, and the display position information stored in each memory is in one-to-one correspondence with the regions of the lighting space.

Specifically, the lighting devices access corresponding CIE 1931 color coordinates and brightness values in the data packets they received based on a stereo spatial correspondence after receiving the data packets broadcasted by the communication module, driving RGB beads of the lighting devices to output light with a corresponding color and brightness, thereby linking the streaming audio and video data with the lighting devices and achieving a dynamic and immersive atmosphere with flowing colors and light.

The present disclosure also provides a computer-readable storage medium, stored with a computer program, wherein the method for linking the streaming audio and video data with the lighting devices mentioned above is implemented by executing the computer program through a processor.

In any possible technical detail combination level, the present disclosure can be a system, a method, and/or a computer program product. The computer program product may comprise a computer-readable storage medium on which computer-readable program instructions are loaded to enable a processor to implement various aspects of the present disclosure.

The computer-readable storage medium may be a tangible device that can hold and store instructions used by an instruction execution device. Examples of computer-readable storage medium comprise electronic storage devices, magnetic storage devices, optical storage devices, electromagnetic storage devices, semiconductor storage devices, or any suitable combination thereof. More specific examples of computer-readable storage medium comprise portable computer disks, hard disks, random access memory (RAM), read-only memory (ROM), erasable programmable read-only memory (EPROM or flash memory), static random access memory (SRAM), portable compressed disk read-only memory (CD-ROM), digital versatile disk (DVD), memory sticks, floppy disks, mechanical coding devices such as punch cards or grooves with protruding structures storing instructions on them, and any suitable combination thereof. The computer-readable storage medium used here is not interpreted as instantaneous signals themselves, such as radio waves or other freely propagating electromagnetic waves, electromagnetic waves propagated through waveguides or other transmission medium (such as optical fiber cable light pulses), or electrical signals transmitted through wires.

The computer-readable program described here can be downloaded from the computer-readable storage medium to various computing/processing devices or downloaded to external computers or external storage devices via networks such as the Internet, LANs, WANs, and/or wireless networks. The networks may comprise copper transmission cables, fiber optic transmission, wireless transmission, routers, firewalls, switches, gateway computers, and/or edge servers. The network adapter or network interface in each computing/processing device receives the computer-readable program instructions from the networks and forwards the computer-readable program instructions to storage in the computer-readable storage medium in each computing/processing device. The computer-readable program instructions for performing operations described herein can be assembly instructions, instruction set architecture (ISA) instructions, machine instructions, machine dependent instructions, microcode, firmware instructions, state setting data, integrated circuit configuration data, or source code/object code written in one or more programming languages comprising object-oriented programming languages such as Smalltalk and C++, and procedural programming languages such as "C" language or similar programming languages. The computer-readable program instructions can be entirely executed on a user's computer, partially executed on a user's computer, executed as an independent software package, partially executed on a user's computer and partially executed on a remote computer or server, or entirely executed on the remote computer or server. The remote computer may be connected to the user's computer via any type of network comprising LANs or WANs, or may be connected to external computers. For example, the remote computer may be connected to external computers via the Internet through an Internet Service Provider. In some embodiments, electronic circuits such as programmable logic circuits, field programmable gate arrays (FPGAs), or programmable logic arrays (PLAs) can be personalized and customized using status information of the computer-readable program instructions, which may execute the computer-readable program instructions to implement various aspects of the present disclosure.

The scope of protection of the method for linking the streaming audio and video data with the lighting devices described in the present disclosure is not limited to the sequence of operations listed herein. Any scheme realized by adding or subtracting operations or replacing operations of the traditional techniques according to the principle of the present disclosure is included in the scope of protection of the present disclosure.

The present disclosure also provides a system for linking streaming audio and video data with lighting devices. The system can implement the method for linking the streaming audio and video data with the lighting devices described in the present disclosure, but the device for implementing the above-mentioned method includes, but is not limited to, the configuration of the system as described in the present disclosure. Any configuration adjustment or replacement of the prior art made according to the principles of the present disclosure is included in the scope of the present disclosure.

In summary, the system and method for linking the streaming audio and video data with the lighting devices, and the computer-readable storage medium of the present disclosure have the following beneficial effects:

First, the present disclosure utilizes BLE devices' capability to connect to smart terminals directly, and by configuring the main device and the lights that are linked to the video through a smart terminal, the configuration process is simplified and becomes more visual.

Second, the present disclosure adopts wireless communication dual-mode technologies to control the color and brightness of the lights wirelessly. This avoids the need for cumbersome wiring and reduces the installation workload.

Third, the system of the present disclosure can be easily connected to third-party smart home systems or smart lighting systems. At the same time, BLE devices use a private protocol that ensures real-time system updates through OTA, keeping BLE devices in their latest functional state.

Fourth, the present disclosure uses wireless control technologies and video full-screen real-time feature extraction technologies to easily achieve an immersive linkage experience in three-dimensional space.

Fifth, the system of the present disclosure realizes immersive lighting-interactive entertainment effects. The lighting devices can be a variety of colored wireless intelligent lamps, or may be colored light strips, lamp tubes, floor lamps, bedside lamps and other lighting devices that support pixel points or pixel segments.

Sixth, in the present disclosure, corresponding regions are obtained through planar division of a lighting space encompassing the lighting devices based on a stereo spatial correspondence between the lighting devices and the regions, information of which is directly written into the respective memory of the lighting devices. This allows for easy changes to the lights that are linked to the video, and the streaming audio and video data can be linked with the lighting devices in real time without relaying on a special video linkage bridge, so as to achieve a dynamic and immersive atmosphere with flowing colors and light.

The above-mentioned embodiments are for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A system for linking streaming audio and video data with lighting devices, comprising:
   an HDMI parsing device, configured to be communicatively connected to a smart terminal and to receive a control instruction sent by the smart terminal, wherein the HDMI parsing device selects streaming media content based on the control instruction and parses the streaming media content to obtain a parsing result, where the parsing result comprises video data and audio data;
   wherein when the lighting devices are instructed to be in linkage with the video data, the HDMI parsing device converts color data of each frame of the video data into first rendering data corresponding to different regions obtained through planar division of a lighting space encompassing the lighting devices, and packages the first rendering data into first data packets for broadcasting, wherein the first rendering data are to be used for rendering an immersive lighting effect;

wherein when the lighting devices are instructed to be in linkage with the audio data, the HDMI parsing device extracts attribute information from the audio data, searches for second rendering data corresponding to the attribute information, and packages the second rendering data into second data packets for broadcasting, wherein the first rendering data or the second rendering data comprises rendering data corresponding to each of the regions of the lighting space;

wherein each entry of the first or second rendering data comprises a CIE 1931 color coordinate and a brightness value, and the attribute information of the audio data comprises sound frequency and sound intensity;

wherein the HDMI parsing device comprises a processor, and the processor is configured to search for an RGB value and a brightness value of each region corresponding to the sound intensity of the audio data, and convert the RGB value of each region corresponding to the sound intensity into the corresponding CIE 1931 color coordinate, wherein the processor is further configured to package the CIE 1931 color coordinate and the brightness value corresponding to each region into one of the data packets, and the brightness value changes along with the sound intensity;

lighting devices, configured to be communicatively connected to the HDMI parsing device and to receive the first or second data packets, wherein the lighting devices access corresponding entries of rendering data in the data packets they received based on display position information stored in their respective memory, and respectively generate lighting effects based on the corresponding entries of rendering data.

2. The system for linking the streaming audio and video data with the lighting devices according to claim 1, wherein the HDMI parsing device further comprises:

an HDMI matrix chip, configured to select the streaming media content based on the control instruction and separate the video data from the audio data;

a down-conversion chip, configured to convert the video data into RGB arrays of pictures with a preset frame rate; and a communication module, configured to broadcast the data packets;

wherein the processor is configured to count numbers of pixels of the video data corresponding to different region s of the lighting space, to add up RGB values of the pixels of each region to obtain an accumulated RGB value and an average RGB value of the region, wherein the processor is further configured to calculate a brightness value of each region based on the average RGB value of the region, and converts the average RGB value of each region into a corresponding CIE 1931 color coordinate; wherein the processor is further configured to package the CIE 1931 color coordinate and brightness value corresponding to each region into one of the data packet s in an order based on the planar division.

3. The system for linking the streaming audio and video data with the lighting devices according to claim 2, wherein the display position information stored in the respective memory of the lighting devices comprises a stereo spatial correspondence between the lighting devices and the regions.

4. The system for linking the streaming audio and video data with the lighting devices according to claim 3, wherein the lighting devices access corresponding CIE 1931 color coordinates and brightness values in the data packets they received based on the stereo spatial correspondence after receiving the data packets broadcasted by the communication module, driving RGB beads of the lighting devices to output light with a corresponding color and brightness.

5. The system for linking the streaming audio and video data with the lighting devices according to claim 2, wherein the communication module comprises a ZigBee&BLE dual-module or a WiFi&BLE dual-module.

6. The system for linking the streaming audio and video data with the lighting devices according to claim 2, wherein the HDMI parsing device supports HDMI 2.1, HDMI 2.0 and HDMI 1.4, and the streaming media content comprises one or more of a streaming media content with a 4K resolution and a 120 Hz refresh rate and a streaming media content with an 8K resolution and a 60 Hz refresh rate.

7. A method for linking streaming audio and video data with lighting devices, comprising:

receiving a control instruction sent by a smart terminal, selecting streaming media content based on the control instruction, and parsing the streaming media content to obtain a parsing result, wherein the parsing result comprises video data and audio data;

when the lighting devices are instructed to be in linkage with the video data, converting color data of each frame of the video data into first rendering data corresponding to different regions obtained through planar division of a lighting space encompassing the lighting devices, and packaging the first rendering data into first data packets for broadcasting, wherein the first rendering data are to be used for rendering an immersive lighting effect;

when the lighting devices are instructed to be in linkage with the audio data, extracting attribute information from the audio data, searching for second rendering data corresponding to the attribute information, and packaging the second rendering data into second data packets for broadcasting, wherein the first rendering data or the second rendering data comprises rendering data corresponding to each of the regions of the lighting space, wherein each entry of the first or second rendering data comprises a CIE 1931 color coordinate and a brightness value, and the attribute information of the audio data comprises sound frequency and sound intensity; wherein the packaging of the data packets comprises searching for an RGB value and a brightness value of each region corresponding to the sound intensity of the audio data, converting the RGB value of each region corresponding to the sound intensity into the corresponding CIE 1931 color coordinate, and packaging the CIE 1931 color coordinate and the brightness value corresponding to each region into one of the data packets; wherein the brightness value changes along with the sound intensity;

when the lighting devices receive the first or second data packets, accessing corresponding entries of rendering data in the data packets they received based on display position information stored in their respective memory, and respectively generating lighting effects based on the corresponding entries of rendering data.

8. A non-transitory computer-readable storage medium, stored with a computer program, wherein the method for linking the streaming audio and video data with the lighting devices according to claim 7 is implemented by executing the computer program through a processor.

* * * * *